United States Patent
Qiao

(10) Patent No.: US 11,588,890 B2
(45) Date of Patent: Feb. 21, 2023

(54) SYSTEM, METHOD AND APPARATUS HAVING A REDUNDANT CLUSTER FOR PROCESSING DATA

(71) Applicants: Beijing Jingdong Shangke Information Technology Co., Ltd., Beijing (CN); Beijing Jingdong Century Trading Co., Ltd., Beijing (CN)

(72) Inventor: Chao Qiao, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 0 days.

(21) Appl. No.: 16/629,497

(22) PCT Filed: Jul. 6, 2018

(86) PCT No.: PCT/CN2018/094878
§ 371 (c)(1),
(2) Date: Jan. 8, 2020

(87) PCT Pub. No.: WO2019/019897
PCT Pub. Date: Jan. 31, 2019

(65) Prior Publication Data
US 2020/0204624 A1 Jun. 25, 2020

(30) Foreign Application Priority Data
Jul. 28, 2017 (CN) .......................... 201710628061.6

(51) Int. Cl.
*H04L 67/1095* (2022.01)
*H04L 67/1074* (2022.01)
*H04L 67/1097* (2022.01)

(52) U.S. Cl.
CPC ...... *H04L 67/1095* (2013.01); *H04L 67/1078* (2013.01); *H04L 67/1097* (2013.01)

(58) Field of Classification Search
CPC ............. H04L 67/1095; H04L 67/1078; H04L 67/1097
See application file for complete search history.

(56) References Cited

U.S. PATENT DOCUMENTS

| | | | |
|---|---|---|---|
| 6,195,680 B1 * | 2/2001 | Goldszmidt | H04L 47/2416 709/203 |
| 2002/0091825 A1 * | 7/2002 | Shuster | H04L 47/29 709/226 |
| 2005/0278458 A1 | 12/2005 | Berger et al. | |

FOREIGN PATENT DOCUMENTS

| | | |
|---|---|---|
| CN | 101771494 A | 7/2010 |
| CN | 104539690 A | 4/2015 |

(Continued)

OTHER PUBLICATIONS

International Search Report and Written Opinion for PCT/CN2018/094878, dated Sep. 29, 2018, 2 pages.

*Primary Examiner* — John A Follansbee
*Assistant Examiner* — Kamal M Hossain
(74) *Attorney, Agent, or Firm* — Blank Rome LLP

(57) ABSTRACT

Disclosed are a data processing system, a method and an apparatus. The system includes: a first client, a data synchronization terminal, and a second client. The first client is configured to send data indicated by a data sending instruction to a first server cluster in a first server cluster group. The data synchronization terminal is configured to synchronize data in the first server cluster of the first server cluster group to a second server cluster in a second server cluster group. The second client is configured to acquire data from a target second server cluster; determine, in response to that transmission of data with location information currently being (Continued)

acquired from the target second server cluster is interrupted, target second location information from a predetermined target second location information group; and continue to acquire data from the storage location indicated by the target second location information.

15 Claims, 6 Drawing Sheets

(56) References Cited

FOREIGN PATENT DOCUMENTS

| | | | | | |
|---|---|---|---|---|---|
| CN | 104618219 A | * | 5/2015 | | |
| CN | 104980519 A | | 10/2015 | | |
| CN | 105554138 A | | 5/2016 | | |
| CN | 105610953 A | | 5/2016 | | |
| CN | 106933625 A | | 7/2017 | | |
| CN | 106953901 A | | 7/2017 | | |
| CN | 106953901 B | * | 4/2020 | ........... | G06F 16/182 |

* cited by examiner

SYSTEM, METHOD AND APPARATUS HAVING A REDUNDANT CLUSTER FOR PROCESSING DATA

CROSS-REFERENCE TO RELATED APPLICATIONS

This patent application is a national stage of International Application No. PCT/CN2018/094878, filed on Jul. 6. 2018 which claims priority to Chinese Patent Application No. 201710628061.6, filed on Jul. 28, 2017, by BEIJING JING-DONG SHANGKE INFORMATION TECHNOLOGY CO., LTD. and BEIJING JINGDONG CENTURY TRADING CO., LTD., and entitled "Data processing system, method and apparatus," the entire contents of which are herein incorporated by reference.

TECHNICAL FIELD

Embodiments of the present disclosure relate to the field of computer technology, specifically to the field of Internet technology, and more particularly to a system, method and apparatus for processing data.

BACKGROUND

Existing data processing systems (such as Kafka distributed publish and subscribe messaging system) usually provide data storage services by using a single server cluster. For example, a producer sends the produced data to the server cluster through a producer client, and a customer acquires data from the server cluster through a consumer client. Therefore, the existing data processing systems have the problems of poor stability and low data processing efficiency.

SUMMARY

Embodiments of the present disclosure are directed to provide an improved system, method and apparatus for processing data to solve a part of the technical problems mentioned in the background portion.

In a first aspect, an embodiment of the present disclosure provides a system for processing data, including a first client, a data synchronization terminal, and a second client. The first client is configured to receive a data sending instruction, and send data indicated by the data sending instruction to a first server cluster in a first server cluster group; the data synchronization terminal is configured to synchronize data in the first server cluster of the first server cluster group to a second server cluster in a second server cluster group; and the second client is configured to acquire data from a target second server cluster, the target second server cluster belonging to the second server cluster group; determine, in response to that transmission of data with location information currently being acquired from the target second server cluster is interrupted, a target second location information group in a pre-stored second location information group set based on the location information, where each piece of second location information included in each second location information group of the second location information group set corresponds to a different second server cluster in the second server cluster group, and the target second location information group contains second location information matching the location information; select the second location information from the target second location information group as target second location information; and continue to acquire data from the storage location indicated by the target second location information in the second server cluster corresponding to the target second location information.

In some embodiments, each piece of second location information in the second location information group set corresponds to a piece of first location information, and the first location information is information stored in a first server cluster about a storage location of data indicated by each piece of second location information stored in the second location information group.

In some embodiments, the second client is further configured to: determine a target corresponding relationship in a pre-stored corresponding relationship list, where each corresponding relationship in the corresponding relationship list comprises second location information and first location information, the storage location indicated by the second location information is a storage location in the target second server cluster, and the target corresponding relationship is a corresponding relationship in which the included second location information matches the location information; search the second location information group set for a second location information group where corresponding first location information is the same as the first location information included in the target corresponding relationship, and use the found second location information group as the target second location information group.

In some embodiments, the location information includes an index number, and the second location information included in each corresponding relationship of the corresponding relationship list includes a first index number; and the second client is further configured to: search the corresponding relationship list for a corresponding relationship in which the included second location information is the same as the location information; and search, in response to the corresponding relationship being not found, the corresponding relationship list for a corresponding relationship in which the included second location information comprises a target first index number, and use the found corresponding relationship in which the included second location information includes the target first index number as the target corresponding relationship, where the target first index number satisfies any one of following conditions: closest to the index number and smaller than the index number, or closest to the index number and greater than the index number.

In some embodiments, the second client is further configured to: perform following processing: adding or subtracting the index number by a preset value to obtain an index number range, searching a corresponding relationship in which the included second location information includes the target first index number among the corresponding relationships that the first index numbers in the included second location information are within the index number range in the corresponding relationship list, and using, in response to the corresponding relationship being found, the found corresponding relationship in which the included second location information includes the target first index number as the target corresponding relationship; and increase the current preset value in response to that the corresponding relationship that the included second location information includes the target first index number is not found, and continue to perform the processing.

In some embodiments, the system further includes a monitoring terminal, configured to: monitor a load of each first server cluster in the first server cluster group, and feed the monitored load of each first server cluster in the first server cluster group back to the first client; and/or monitor a load of each second server cluster in the second server cluster group, and feed the monitored load of each second server cluster in the second server cluster group back to the second client.

In some embodiments, the second client is further configured to: obtain a candidate second server cluster group based on the target second location information group; select, based on the latest received load of each candidate second server cluster in the candidate second server cluster group, a candidate second server cluster from the candidate second server cluster group, and use the second location information in the target second location information group corresponding to the selected candidate second server cluster as target second location information.

In some embodiments, some of the second server clusters in the second server cluster group are deployed in a given machine room, and the second client has corresponding machine room information; and the second client is further configured to: determine whether non-overload candidate second server clusters exist among the candidate second server clusters deployed in a machine room indicated by the machine room information in the candidate second server cluster group, and select, in response to that non-overload candidate second server clusters exist, a candidate second server cluster having a minimum load from the non-overload candidate second server clusters.

In some embodiments, the second client is further configured to: select, in response to that non-overload candidate second server clusters do not exist, a non-overload candidate second server cluster having a minimum load from the candidate second server clusters not deployed in the machine room indicated by the machine room information in the candidate second server cluster group.

In some embodiments, the monitoring terminal is further configured to: send, when monitoring that a first server cluster in the first server cluster group is overloaded, a first cluster switching instruction to at least one first client in a first client group currently connected to the first server cluster; and/or send, when monitoring that a second server cluster in the second server cluster group is overloaded, a second cluster switching instruction to at least one second client in a second client group currently connected to the second server cluster.

In some embodiments, the first client is further configured to: switch, in response to receiving the first cluster switching instruction sent by the monitoring terminal, from the currently connected first server cluster to the first server cluster indicated by the received first cluster switching instruction.

In some embodiments, the second client is further configured to: switch, in response to receiving the second cluster switching instruction sent by the monitoring terminal, from the currently connected second server cluster to the second server cluster indicated by the received second cluster switching instruction.

In some embodiments, the monitoring terminal is further configured to: send, when monitoring that bandwidth utilization of a first server cluster in the first server cluster group exceeds a threshold, a first speed limit instruction comprising a first transmission speed to at least one first client in the first client group currently connected to the first server cluster; and/or send, when monitoring that bandwidth utilization of a second server cluster in the second server cluster group exceeds the threshold, a second speed limit instruction comprising a second transmission speed to at least one second client in the second client group currently connected to the second server cluster.

In some embodiments, the first client is further configured to: send, in response to receiving the first speed limit instruction sent by the monitoring terminal, data using the first transmission speed included in the received first speed limit instruction.

In some embodiments, the second client is further configured to: acquire, in response to receiving the second speed limit instruction sent by the monitoring terminal, data using the second transmission speed included in the received second speed limit instruction.

In a second aspect, an embodiment of the present disclosure provides a method for processing data, including: determining, in response to that the transmission of data with location information currently being acquired from a target second server cluster is interrupted, a target second location information group in a pre-stored second location information group set based on the location information, where the target second server cluster belongs to a second server cluster group, each piece of second location information included in each second location information group of the second location information group set corresponds to a different second server cluster in the second server cluster group, and the target second location information contains second location information matching the location information; selecting the second location information from the target second location information group as target second location information; and continuing to acquire data from the storage location indicated by the target second location information in the second server cluster corresponding to the target second location information.

In some embodiments, each piece of second location information in the second location information group set corresponds to a piece of first location information, and the first location information is information stored in a first server cluster about a storage location of data indicated by each piece of second location information stored in the second location information group.

In some embodiments, the determining a target second location information group in a pre-stored second location information group set based on the location information includes: determining a target corresponding relationship in a pre-stored corresponding relationship list, where each corresponding relationship in the corresponding relationship list includes second location information and first location information, the storage location indicated by the second location information is a storage location in the target second server cluster, and the target corresponding relationship is a corresponding relationship in which the included second location information matches the location information; and searching the second location information group set for a second location information group where the corresponding first location information is the same as the first location information included in the target corresponding relationship, and using the found second location information group as the target second location information group.

In some embodiments, the location information includes an index number, and the second location information included in each corresponding relationship in the corresponding relationship list includes a first index number; and the determining a target corresponding relationship in a pre-stored corresponding relationship list includes: searching the corresponding relationship list for a corresponding relationship in which the included second location information is the same as the location information; and searching, in response to the corresponding relationship being not found, the corresponding relationship list for a corresponding relationship in which the included second location information includes a target first index number, and using the found corresponding relationship in which the included second location information includes the target first index number as the target corresponding relationship, where the target first index number satisfies any one of the following conditions: closest to the index number and smaller than the index number, or closest to the index number and greater than the index number.

In some embodiments, the searching the corresponding relationship list for a corresponding relationship in which the included second location information includes a target first index number includes: performing the following processing: adding or subtracting the index number by a preset value to obtain an index number range, searching a corresponding relationship in which the included second location information includes the target first index number among the corresponding relationships that the first index numbers in the included second location information are within the index number range in the corresponding relationship list, and using, in response to the corresponding relationship being found, the found corresponding relationship in which the included second location information includes the target first index number as the target corresponding relationship; and increasing the current preset value in response to that the corresponding relationship that the included second location information includes the target first index number is not found, and continuing to perform the processing.

In some embodiments, the selecting the second location information from the target second location information group as target second location information includes: obtaining a candidate second server cluster group based on the target second location information group; and selecting, based on the latest received load of each candidate second server cluster in the candidate second server cluster group, a candidate second server cluster from the candidate second server cluster group, and using the second location information in the target second location information group corresponding to the selected candidate second server cluster as the target second location information, where the load is received from a connected monitoring terminal.

In some embodiments, some of the second server clusters in the second server cluster group may be deployed in a given machine room, and the second client may have corresponding machine room information; and the selecting, based on the latest received load of each candidate second server cluster in the candidate second server cluster group, a candidate second server cluster from the candidate second server cluster group includes: determining whether non-overload candidate second server clusters exist among the candidate second server clusters deployed in a machine room indicated by the machine room information in the candidate second server cluster group, and selecting, in response to that non-overload candidate second server clusters exist, a candidate second server cluster having a minimum load from the non-overload candidate second server clusters.

In some embodiments, the selecting, based on the latest received load of each candidate second server cluster in the candidate second server cluster group, a candidate second server cluster from the candidate second server cluster group includes: selecting, in response to that non-overload candidate second server clusters do not exist, a non-overload candidate second server cluster having a minimum load from the candidate second server clusters not deployed in the machine room indicated by the machine room information in the candidate second server cluster group.

In some embodiments, the method further includes: switching, in response to receiving the second cluster switching instruction sent by the monitoring terminal, from the currently connected second server cluster to the second server cluster indicated by the received second cluster switching instruction.

In some embodiments, the method further includes: acquiring, in response to receiving a second speed limit instruction including a second transmission speed sent by the monitoring terminal, data using the second transmission speed.

In a third aspect, an embodiment of the present disclosure provides an apparatus for processing data, including: a determining unit, configured to determine, in response to that the transmission of data with location information currently being acquired from a target second server cluster is interrupted, a target second location information group in a pre-stored second location information group set based on the location information, where the target second server cluster belongs to a second server cluster group, each piece of second location information included in each second location information group of the second location information group set corresponds to a different second server cluster in the second server cluster group, and the target second location information contains second location information matching the location information; a selecting unit, configured to select the second location information from the target second location information group as target second location information; and an acquiring unit, configured to continue to acquire data from the storage location indicated by the target second location information in the second server cluster corresponding to the target second location information.

In some embodiments, each piece of second location information in the second location information group set corresponds to a piece of first location information, and the first location information is information stored in a first server cluster about a storage location of data indicated by each piece of second location information stored in the second location information group.

In some embodiments, the determining unit includes: a determining subunit, configured to determine a target corresponding relationship in a pre-stored corresponding relationship list, where each corresponding relationship in the corresponding relationship list includes second location information and first location information, the storage location indicated by the second location information is a storage location in the target second server cluster, and the target corresponding relationship is a corresponding relationship in which the included second location information matches the location information; and a search subunit, configured to search the second location information group set for a second location information group where the corresponding first location information is the same as the first location information included in the target corresponding relationship, and use the found second location information group as the target second location information group.

In some embodiments, the location information includes an index number, and the second location information included in each corresponding relationship of the corresponding relationship list includes a first index number; and the determining subunit includes: a first search module, configured to search the corresponding relationship list for a corresponding relationship in which the included second location information is the same as the location information; and a second search module, configured to search, in response to the corresponding relationship being not found, the corresponding relationship list for a corresponding relationship in which the included second location information includes a target first index number, and use the found corresponding relationship that the included second location information includes the target first index number as the target corresponding relationship, where the target first index number satisfies any one of the following conditions: closest to the index number and smaller than the index number, or closest to the index number and greater than the index number.

In some embodiments, the second search module is further configured to: perform the following processing steps: adding or subtracting the index number by a preset value to obtain an index number range, searching a corresponding relationship in which the included second location information includes the target first index number among the corresponding relationships that the first index numbers in the included second location information are within the index number range in the corresponding relationship list, and using, in response to the corresponding relationship being found, the found corresponding relationship in which the included second location information includes the target first index number as the target corresponding relationship; and increase the current preset value in response to that the corresponding relationship in which the included second location information includes the target first index number is not found, and continue to perform the processing steps.

In some embodiments, the selecting unit includes: a candidate second server cluster group determining subunit, configured to obtain a candidate second server cluster group based on the target second location information group; and a processing subunit, configured to select, based on the latest received load of each candidate second server cluster in the candidate second server cluster group, a candidate second server cluster from the candidate second server cluster group, and use the second location information in the target second location information group corresponding to the selected candidate second server cluster as the target second location information, where the load is received from a monitoring terminal connected to the apparatus for processing data.

In some embodiments, some of the second server clusters in the second server cluster group are deployed in a given machine room, and the second client has corresponding machine room information; and the processing subunit includes: a first selecting module, configured to determine whether non-overload candidate second server clusters exist among the candidate second server clusters deployed in a machine room indicated by the machine room information in the candidate second server cluster group, and select, in response to that non-overload candidate second server clusters exist, a candidate second server cluster having a minimum load from the non-overload candidate second server clusters.

In some embodiments, the processing subunit includes: a second selecting module, configured to select, in response to that non-overload candidate second server clusters do not exist, a non-overload candidate second server cluster having a minimum load from the candidate second server clusters not deployed in the machine room indicated by the machine room information in the candidate second server cluster group.

In some embodiments, the apparatus further includes: a switching unit, configured to switch, in response to receiving a second cluster switching instruction sent by the monitoring terminal, from the currently connected second server cluster to the second server cluster indicated by the received second cluster switching instruction.

In some embodiments, the apparatus further includes: a first acquiring unit, configured to acquire, in response to receiving a second speed limit instruction including a second transmission speed sent by the monitoring terminal, data using the second transmission speed.

In a fourth aspect, an embodiment of the present disclosure provides an electronic device, including: one or more processors; and a storage apparatus, configured to store one or more programs, where the one or more programs, when executed by the one or more processors, cause the one or more processors to implement the method according to any implementation in the second aspect.

In a fifth aspect, an embodiment of the present disclosure provides a computer-readable storage medium, storing a computer program thereon, the program, when executed by a processor, causes the processor to implement the method according to any implementation in the second aspect.

According to the system for processing data provided in the embodiment of the present disclosure, a first client sends data indicated by a data sending instruction to a first server cluster in a first server cluster group; a data synchronization terminal synchronizes data in the first server cluster to a second server cluster in a second server cluster group; a second client acquires data from a target second server cluster in the second server cluster group, determines, when the transmission of data with location information currently being acquired from the target second server cluster is interrupted, a target second location information group in a pre-stored second location information group set based on the location information, then selects second location information from the target second location information group as target second location information, and continues to acquire data from the storage location indicated by the target second location information in the second server cluster corresponding to the target second location information. Therefore, the first server cluster group and the second server cluster group are effectively utilized, and the stability and data processing efficiency of the system for processing data are improved by using the second client to determine the target second location information.

According to the method for processing data provided in the embodiment of the present disclosure, when the transmission of data with location information currently being acquired from a target second server cluster is interrupted, a target second location information group is determined in a second location information group set based on the location information, second location information is selected from the target second location information group as target second location information, and the acquisition of data continues from the storage location indicated by the target second location information in the second server cluster corresponding to the target second location information. Therefore, the determination of the target second location information is effectively utilized, the acquisition of data from the beginning in the second server cluster corresponding to the target second location information is avoided, and the data acquisition efficiency is improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
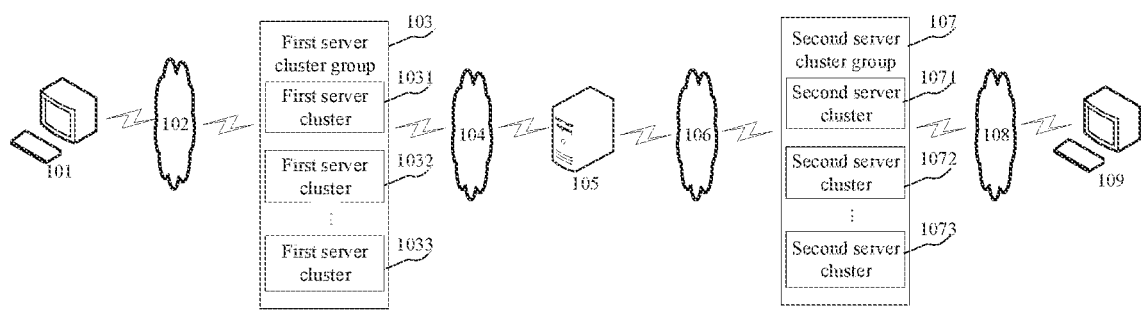
FIG. 1 is an architectural diagram of an exemplary system to which embodiments of the present disclosure may be applied.

FIG. 1 shows an exemplary system architecture 100 to which embodiments of a system, method and apparatus for processing data of the present disclosure may be applied.

As shown in FIG. 1, the system architecture 100 may include a first client 101, networks 102, 104, 106, 108, a first server cluster group 103, a data synchronization terminal 105, a second server cluster group 107, and a second client 109. The first server cluster group 103 may include first server clusters 1031, 1032, 1033, and the second server cluster group 107 may include second server clusters 1071, 1072 and 1073. The network 102 serves as a medium providing a communication link between the first client 101 and the first server cluster group 103. The network 104 serves as a medium providing a communication link between the first server cluster group 103 and the data synchronization terminal 105. The network 106 serves as a medium providing a communication link between the data synchronization terminal 105 and the second server cluster group 107. The network 108 serves as a medium providing a communication link between the second server cluster group 107 and the second client 109. The networks 102, 104, 106, 108 may include various connection types, such as wired or wireless communication links or optical fiber cables.

The first client 101 may interact with the first server clusters 1031, 1032, 1033 in the first server cluster group 103 through the network 102 to send or receive information and the like. For example, a user may send data to the first server clusters 1031, 1032, 1033 in the first server cluster group 103 through the first client 101.

The first server clusters 1031, 1032, 1033 in the first server cluster group 103 may be, for example, server clusters deployed with a Kafka distributed publish and subscribe messaging system, and the server clusters may be used, for example, to store data sent by the first client 101.

The data synchronization terminal 105 may be a server providing various services, for example, synchronizing the data in the first server clusters 1031, 1032, 1033 to the second server clusters 1071, 1072, 1073 in the second server cluster group 107.

The second server clusters 1071, 1072, 1073 in the second server cluster group 107 may be, for example, server clusters deployed with a Kafka distributed publish and subscribe messaging system, and the server clusters may be used, for example, to store the data extracted from the first server clusters 1031, 1032, 1033 by the data synchronization terminal 105.

The second client 109 may interact with the second server clusters 1071, 1072, 1073 in the second server cluster group 107 through the network 108 to send or receive information and the like. For example, the second client 109 may acquire data from the second server clusters 1071, 1072, 1073, and perform corresponding processing when the transmission of data currently being acquired is interrupted.

The first client 101 and the second client 109 may be installed with various communication client applications, such as web browser applications, shopping applications, game applications, and social platform software. The first client 101 and the second client 109 may be various electronic devices, including but not limited to a smart phone, a tablet computer, a laptop computer, a desktop computer, etc.

It should be noted that the method for processing data according to some embodiments of the present disclosure is generally executed by the second client 109. Accordingly, the apparatus for processing data is generally provided in the second client 109.

It should be appreciated that the numbers of the first client, the networks, the first server cluster group, the data synchronization terminal, the second server cluster group, and the second client in FIG. 1 are merely illustrative. Any number of the first client, the networks, the first server cluster group, the data synchronization terminal, the second server cluster group, and the second client may be provided based on implementation requirements. In addition, the numbers of the first server clusters and the second server clusters included in the first server cluster group and the second server cluster group respectively may be set according to actual needs.

Figure 2:
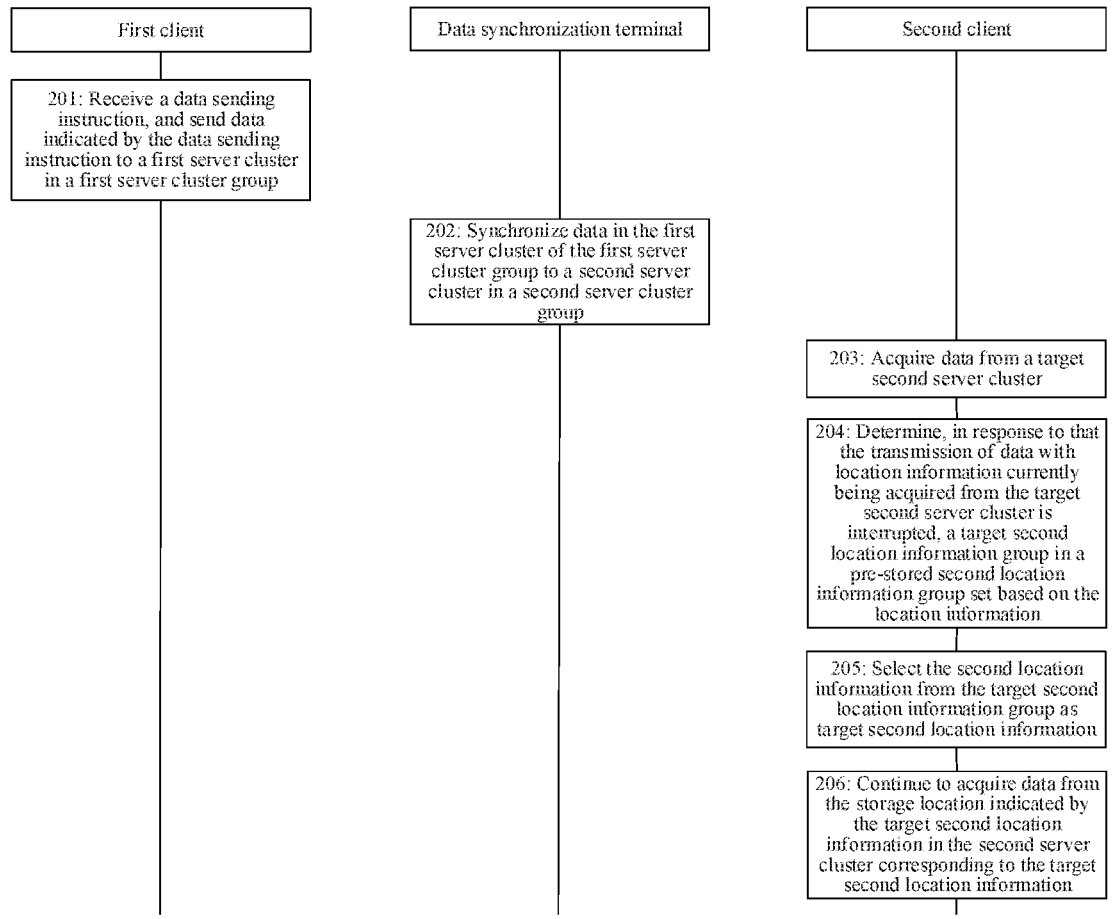
FIG. 2 is a flowchart of a system for processing data according to an embodiment of the present disclosure.

Further, referring to FIG. 2, a sequence diagram of a system for processing data according to an embodiment of the present disclosure is shown.

The system for processing data according to the present embodiment may include: a first client, a data synchronization terminal, and a second client. The first client is configured to receive a data sending instruction, and send data indicated by the data sending instruction to a first server cluster in a first server cluster group. The data synchronization terminal is configured to synchronize data in the first server cluster of the first server cluster group to a second server cluster in a second server cluster group. The second client is configured to acquire data from a target second server cluster, the target second server cluster belonging to the second server cluster group; determine, in response to that the transmission of data with location information currently being acquired from the target second server cluster is interrupted, a target second location information group in a pre-stored second location information group set based on the location information, where each piece of second location information included in each second location information group of the second location information group set corresponds to a different second server cluster in the second server cluster group set, and the target second location information group contains second location information matching the location information; select the second location information from the target second location information group as target second location information; and continue to acquire data from the storage location indicated by the target second location information in the second server cluster corresponding to the target second location information.

As shown in FIG. 2, in step 201, the first client receives a data sending instruction, and sends data indicated by the data sending instruction to the first server cluster in the first server cluster group.

In the present embodiment, the first client (for example, the first client 101 shown in FIG. 1) may receive locally the data sending instruction triggered by a user, and send the data indicated by the data sending instruction to the first server cluster (for example, the first server cluster 1031, 1032, or 1033 shown in FIG. 1) in the first server cluster group (for example, the first server cluster group 103 shown in FIG. 1). Here, the first server cluster to which the first client is currently connected may be a first server cluster preassigned for the first client, or a first server cluster selected by the first client from the first server cluster group, for example, a first server cluster selected using a load balancing algorithm, which is not limited by the present embodiment. It should be noted that the load balancing algorithm may include a polling method, a random method, a least connections method, and the like. The load balancing algorithm is a well-known technology widely studied and applied at present, and details are not described herein again.

In some alternative implementations of the present embodiment, each piece of data sent by the first client to the first server cluster in the first server cluster group may have a corresponding topic, and the topic may be, for example, a topic related to food, sports, entertainment news or the like, such as "simple ways of braised fish", "football athletes", or "the most popular actress in 2017".

In step 202, the data synchronization terminal synchronizes data in the first server cluster of the first server cluster group to the second server cluster in the second server cluster group.

In the present embodiment, the data synchronization terminal (for example, the data synchronization terminal 105 shown in FIG. 1) may synchronize the data in the first server cluster of the first server cluster group to the second server cluster (for example, the second server cluster 1071, 1072, or 1073 shown in FIG. 1) in the second server cluster group (for example, the second server cluster group 107 shown in FIG. 1) in real time or periodically (for example, every half hour or an hour, or the like.). As an example, the data synchronization terminal may synchronize the data in the first server cluster of the first server cluster group to each second server cluster in the second server cluster group.

In some alternative implementations of the present embodiment, each second server cluster in the second server cluster group may have a corresponding topic, and the data synchronization terminal may synchronize the data having a topic in the first server cluster of the first server cluster group to the second server cluster having the same topic as the topic corresponding to the data.

In step 203, the second client acquires data from a target second server cluster.

In the present embodiment, the second client (for example, the second client 109 shown in FIG. 1) may acquire data from the target second server cluster through a wired or wireless connection. The target second server cluster belongs to the second server cluster group. In addition, the target second server cluster may be a second server cluster preassigned for the second client, or a second server cluster selected by the second client from the second server cluster group, for example, a second server cluster selected using a load balancing algorithm, which is not limited by the present embodiment.

In step 204, in response to that the transmission of data with location information currently being acquired from the target second server cluster is interrupted, the second client determines, based on the location information, a target second location information group in a pre-stored second location information group set.

In the present embodiment, in response to that the transmission of data with location information currently being acquired from the target second server cluster is interrupted, the second client may determine, based on the location information, the target second location information group in the pre-stored second location information group set. The location information may be information about a storage location of the data in the target second server cluster. Each piece of second location information included in each second location information group of the second location information group set may correspond to a different second server cluster in the second server cluster group. The target second location information contains second location information matching (for example, identical to, or the like.) the location information, As an example, the second client may search the second location information group set for a second location information group including second location information identical to the location information, and use the found second location information group as the target second location information group. It should be noted that when the transmission speed of the data being acquired and having the location information is zero, or when the second client receives transmission abnormality information about the data, or the like, the second client may determine that the transmission of the data is interrupted, and the present embodiment does not limit the content in this regard.

In some alternative implementations of the present embodiment, each second location information group in the second location information group set may correspond to first location information, and the first location information may be information stored in the first server cluster about a storage location of data indicated by each piece of second location information stored in the second location information group. It should be noted that the corresponding relationship between the second location information group and the corresponding first location information may be recorded by the data synchronization terminal. The data synchronization terminal may further be configured to periodically record the corresponding relationship between the storage locations of the synchronized data in the first server cluster and the second server cluster.

In some alternative implementations of the present embodiment, the second client may determine a target corresponding relationship in a pre-stored corresponding relationship list. Each corresponding relationship in the corresponding relationship list may include second location information and first location information, the storage location indicated by the second location information may be a storage location in the target second server cluster, and the target corresponding relationship may be a corresponding relationship in which the included second location information matches (for example, is identical to, or the like) the location information. The second client may search the second location information group set for a second location information group in where the corresponding first location information is the same as the first location information included in the target corresponding relationship, and use the found second location information group as the target second location information group. As an example, the second client may search the corresponding relationship list for a corresponding relationship in that the included second location information is the same as the location information, and if the corresponding relationship is found, the second client may use the found corresponding relationship as the target corresponding relationship. It should be noted that the corresponding relationship in the corresponding relationship list may be recorded by the data synchronization terminal.

In some alternative implementations of the present embodiment, each second server cluster of the second server cluster group may be provided with a subarea for storing data. The location information may include an index number, and the index number may be an offset of the data being acquired and having the location information in the subarea of the target second server cluster. The second location information included in each corresponding relationship of the corresponding relationship list may include a first index number. Here, if the second client does not find the corresponding relationship in which the included second location information is the same as the location information in the corresponding relationship list, the second client may search the corresponding relationship list for a corresponding relationship in which the included second location information includes a target first index number, and use the found corresponding relationship in which the included second location information includes the target first index number as the target corresponding relationship. The target first index number may satisfy any one of the following conditions: closest to the index number and smaller than the index number, or closest to the index number and greater than the index number.

As an example, the second client may perform the following processing steps: adding or subtracting the index number by a preset value to obtain an index number range, searching a corresponding relationship in which the included second location information includes the target first index number among the corresponding relationships that the first index numbers in the included second location information are within the index number range in the corresponding relationship list, and using, if found, the found corresponding relationship in which the included second location information includes the target first index number as the target corresponding relationship; and increase the current preset value (for example, increase by 1000, or the like) if the corresponding relationship in which the included second location information includes the target first index number is not found, and continue to perform the processing steps. It should be noted that the initial value of the preset value may be, for example, 1000, and the initial value of the preset value and the value increasing the current preset value each time may be set according to actual needs, which is not limited in the present embodiment.

In step 205, the second client selects the second location information from the target second location information group as target second location information.

In the present embodiment, after the second client determines the target second location information group, the second client may select the second location information from the target second location information group as the target second location information. As an example, the second client may randomly select the second location information from the target second location information group as the target second location information. It should be noted that the target second location information determined by the second client is usually not the second location information corresponding to the target second server cluster.

In step 206, in the second server cluster corresponding to the target second location information, the acquisition of data continues from the storage location indicated by the target second location information.

In the present embodiment, after the second client determines the target second location information, the second client may continue to acquire data from the storage location indicated by the target second location information in the second server cluster corresponding to the target second location information.

Figure 3:
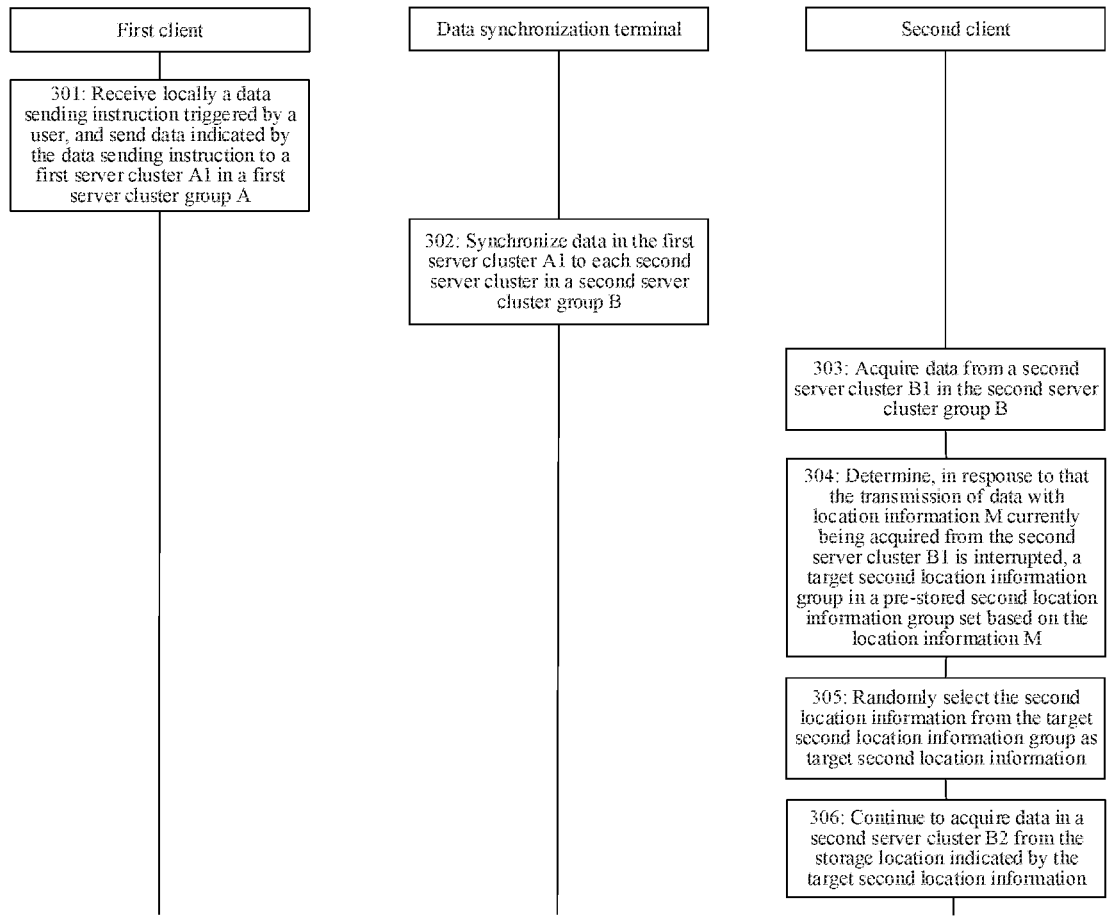
FIG. 3 is a schematic diagram of an application scenario of the system for processing data according to an embodiment of the present disclosure.

With continued reference to FIG. 3, FIG. 3 is a sequence diagram of an application scenario of the system for processing data according to an embodiment. In the application scenario of FIG. 3, the first client has a preassigned first server cluster A1, the first server cluster A1 belonging to a first server cluster group A; and the second client has a preassigned second server cluster B1, the second server cluster B1 belonging to a second server cluster group B. As shown by reference sign 301, the first client may receive locally a data sending instruction triggered by a user, and send data indicated by the data sending instruction to the first server cluster A1 in the first server cluster group A. As shown by reference sign 302, the data synchronization terminal may synchronize data in the first server cluster A1 to each second server cluster in the second server cluster group B. As shown by reference sign 303, the second client may acquire data from the second server cluster B1 in the second server cluster group B. As shown by reference sign 304, in response to that the transmission of data with location information M currently being acquired from the second server cluster B1 is interrupted, the second client may determine, based on the location information M, a target second location information group (for example, a second location information group including second location information identical to the location information M) in a pre-stored second location information group set. As shown by reference sign 305, the second client may randomly select the second location information from the target second location information group as target second location information, where the second server cluster B2 corresponding to the target second location information and the second server cluster B1 are different second server clusters. As shown by reference sign 306, the second client may continue to acquire data in a second server cluster B2 from the storage location indicated by the target second location information.

The system provided by the above embodiment of the present disclosure effectively uses the first server cluster group and the second server cluster group, and uses the second client to determine the target second location information, thereby improving the stability and data processing efficiency of the system for processing data.

Figure 4:
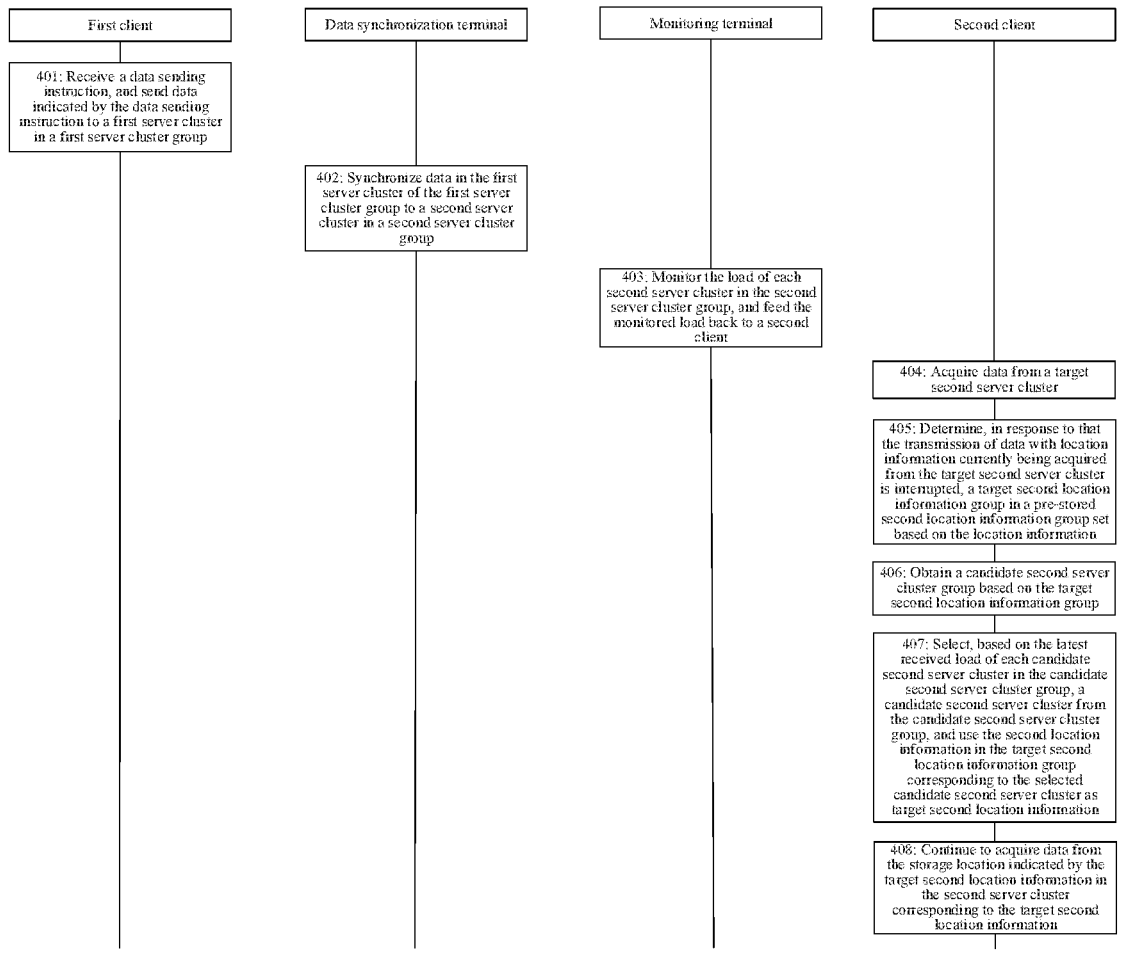
FIG. 4 is a flowchart of a system for processing data according to another embodiment of the present disclosure.

Further, refer to FIG. 4, which shows a sequence diagram the system for processing data according to another embodiment.

The system for processing data according the present embodiment may include: a first client, a data synchronization terminal, a monitoring terminal, and a second client. The first client is configured to receive a data sending instruction, and send data indicated by the data sending instruction to a first server cluster in a first server cluster group. The data synchronization terminal is configured to synchronize data in the first server cluster of the first server cluster group to a second server cluster in a second server cluster group. The monitoring terminal is configured to monitor the load of each second server cluster in the second server cluster group, and feed the monitored load of each second server cluster in the second server cluster group back to the second client. The second client is configured to acquire data from a target second server cluster, where the target second server cluster belongs to the second server cluster group; determine, in response to that the transmission of data with location information currently being acquired from the target second server cluster is interrupted, a target second location information group in a pre-stored second location information group set based on the location information, where each piece of second location information included in each second location information group of the second location information group set corresponds to a different second server cluster in the second server cluster group set, and the target second location information group contains second location information matching the location information; obtain a candidate second server cluster group based on the target second location information group; select a candidate second server cluster from the candidate second server cluster group based on the latest received load of each candidate second server cluster in the candidate second server cluster group, and use the second location information in the target second location information group corresponding to the selected candidate second server cluster as target second location information; and continue to acquire data from the storage location indicated by the target second location information in the second server cluster corresponding to the target second location information.

As shown in FIG. 4, in step 401, the first client receives a data sending instruction, and sends data indicated by the data sending instruction to the first server cluster in the first server cluster group.

In step 402, the data synchronization terminal synchronizes data in the first server cluster of the first server cluster group to the second server cluster in the second server cluster group.

In the present embodiment, for explanations of step 401 and step 402, reference may be made to the relevant descriptions of step 201 and step 202 in the embodiment shown in FIG. 2, respectively, and details are not described herein again.

In step 403, the monitoring terminal monitors the load of each second server cluster in the second server cluster group, and feeds the monitored load back to the second client.

In the present embodiment, the monitoring terminal may monitor the load of each second server cluster in the second server cluster group in real time or periodically (for example, every 10 minutes or half an hour, or the like), and feed the load back to the second client. As an example, a monitoring tool may be pre-deployed on the monitoring terminal, the monitoring tool may acquire monitoring data from each second server cluster in the second server cluster group based on a preset monitoring indicator, and the monitoring tool may also analyze the acquired monitoring data to calculate a value for characterizing the load of each second server cluster in the second server cluster group. The monitoring terminal may feed the value back to the second client. It should be noted that the preset monitoring indicator may include, for example, a hard disk occupancy rate, a memory occupancy rate, a CPU (Central Processing Unit) occupancy rate, a bandwidth utilization rate, and the like.

In step 404, the second client acquires data from a target second server cluster.

In step 405, in response to that the transmission of data with location information currently being acquired from the target second server cluster is interrupted, the second client determines, based on the location information, a target second location information group in a pre-stored second location information group set.

In the present embodiment, for explanations of step 404 and step 405, reference may be made to the relevant descriptions of step 203 and step 204 in the embodiment shown in FIG. 2, respectively, and details are not described herein again.

In step 406, the second client obtains a candidate second server cluster group based on the target second location information group.

In the present embodiment, since each piece of second location information included in each second location information group of the second location information group set corresponds to a different second server cluster in the second server cluster group, the second client may obtain the candidate second server cluster group based on the determined target second location information group. It should be noted that each candidate second server cluster in the candidate second server cluster group is a second server cluster in the second server cluster group.

In step 407, the second client selects, based on the latest received load of each candidate second server cluster in the candidate second server cluster group, a candidate second server cluster from the candidate second server cluster group, and uses the second location information in the target second location information group corresponding to the selected candidate second server cluster as target second location information.

In the present embodiment, after the second client obtains the candidate second server cluster group, the second client may select, based on the latest received load of each candidate second server cluster in the candidate second server cluster group, a candidate second server cluster from the candidate second server cluster group, and use the second location information in the target second location information group corresponding to the selected candidate second server cluster as target second location information. As an example, the second client may select a candidate second server cluster having a minimum load from the candidate second server cluster group, for example, compare the values of loads of every two candidate second server clusters in the candidate second server cluster group to select a candidate second server cluster having the minimum load.

In some alternative implementations of the present embodiment, some of the second server clusters in the second server cluster group may be deployed in a given machine room, and the second client may have corresponding machine room information. The second client may determine whether non-overload candidate second server clusters exist among the candidate second server clusters deployed in the machine room indicated by the machine room information in the candidate second server cluster group, and in response to that non-overload candidate second server clusters exist, the second client may select a candidate second server cluster having a minimum load from the non-overload candidate second server clusters. In response to that non-overload candidate second server clusters do not exist, the second client may select a non-overload candidate second server cluster having a minimum load from the candidate second server clusters not deployed in the machine room indicated by the machine room information in the candidate second server cluster group.

In step 408, the second client continues to acquire data from the storage location indicated by the target second location information in the second server cluster corresponding to the target second location information.

In the present embodiment, after determining the target second location information, the second client may continue to acquire data from the storage location indicated by the target second location information in the second server cluster corresponding to the target second location information.

In some alternative implementations of the present embodiment, when monitoring the load of each second server cluster in the second server cluster group, the monitoring terminal may further monitor the load of each first server cluster in the first server cluster group, and feed the load back to the first client.

In some alternative implementations of the present embodiment, when the transmission of data sent from the first client to the first server clusters in the first server cluster group is interrupted, the first client may select, based on the latest received load of each first server cluster in the first server cluster group, a first server cluster from the first server cluster group as a target first server cluster, and the first client may resend the interrupted data to the target first server cluster. It should be noted that the target first server cluster is usually not the same cluster as the first server cluster connected when the transmission of data is interrupted. Here, some of the first server clusters in the first server cluster group may be deployed in a given machine room, and the first client may have corresponding first machine room information. It should be noted that the method of selecting a target first server cluster may be referred to the method of selecting a candidate second server cluster as described in step 407 of the embodiment shown in FIG. 4, and details are not described herein again.

In some alternative implementations of the present embodiment, some of the first server clusters in the first server cluster group and some of the second server clusters in the second server cluster group may be deployed in a given machine room.

In some alternative implementations of the present embodiment, the monitoring terminal may be further configured to: send, when monitoring that a first server cluster in the first server cluster group is overloaded, a first cluster switching instruction to at least one first client in a first client group currently connected to the first server cluster; and/or send, when monitoring that a second server cluster in the second server cluster group is overloaded, a second cluster switching instruction to at least one second client in a second client group currently connected to the second server cluster. It should be noted that the first server cluster indicated by the first cluster switching instruction may be the first server cluster having the minimum load in the first server cluster group; and the second server cluster indicated by the second cluster switching instruction may be the second server cluster having the minimum load in the second server cluster group.

In some alternative implementations of the present embodiment, the first client may be further configured to: switch, in response to receiving the first cluster switching instruction sent by the monitoring terminal, from the currently connected first server cluster to the first server cluster indicated by the received first cluster switching instruction. In this way, the data transmission efficiency of the first client may be improved.

In some alternative implementations of the present embodiment, the second client may be further configured to: switch, in response to receiving the second cluster switching instruction sent by the monitoring terminal, from the currently connected second server cluster to the second server cluster indicated by the received second cluster switching instruction. In this way, the data acquisition efficiency of the second client may be improved.

In some alternative implementations of the present embodiment, the monitoring terminal may be further configured to: send, when monitoring that the bandwidth utilization of a first server cluster in the first server cluster group exceeds a threshold, a first speed limit instruction including a first transmission speed to at least one first client in the first client group currently connected to the first server cluster; and/or send, when monitoring that the bandwidth utilization of a second server cluster in the second server cluster group exceeds the threshold, a second speed limit instruction including a second transmission speed to at least one second client in the second client group currently connected to the second server cluster. As an example, when the monitoring terminal monitors that the bandwidth utilization of a first server cluster in the first server cluster group exceeds a threshold, the monitoring terminal may send a first speed limit instruction including a first transmission speed to each first client in the first client group currently connected to the first server cluster. When the monitoring terminal monitors that the bandwidth utilization of a second server cluster in the second server cluster group exceeds the threshold, the monitoring terminal may send a second speed limit instruction including a second transmission speed to each second client in the second client group currently connected to the second server cluster.

In some alternative implementations of the present embodiment, the first client may be further configured to: send, in response to receiving the first speed limit instruction sent by the monitoring terminal, data using the first transmission speed included in the received first speed limit instruction. In this way, the bandwidth pressure of the first server cluster currently connected to the first client may be reduced.

In some alternative implementations of the present embodiment, the second client may be further configured to: acquire, in response to receiving the second speed limit instruction sent by the monitoring terminal, data using the second transmission speed included in the received second speed limit instruction. In this way, the bandwidth pressure of the second server cluster currently connected to the second client may be reduced.

It may be seen from FIG. 4 that, compared with the corresponding embodiment of FIG. 2, the system for processing data in the present embodiment highlights the step of determining the target second location information. With the solution described in the present embodiment, the second client may continue to acquire data from the storage location indicated by the target second location information in the second server cluster having the minimum load corresponding to the target second location information, so that the stability of the system for processing data may be further improved, and the data acquisition efficiency of the second client may be improved.

Figure 5:
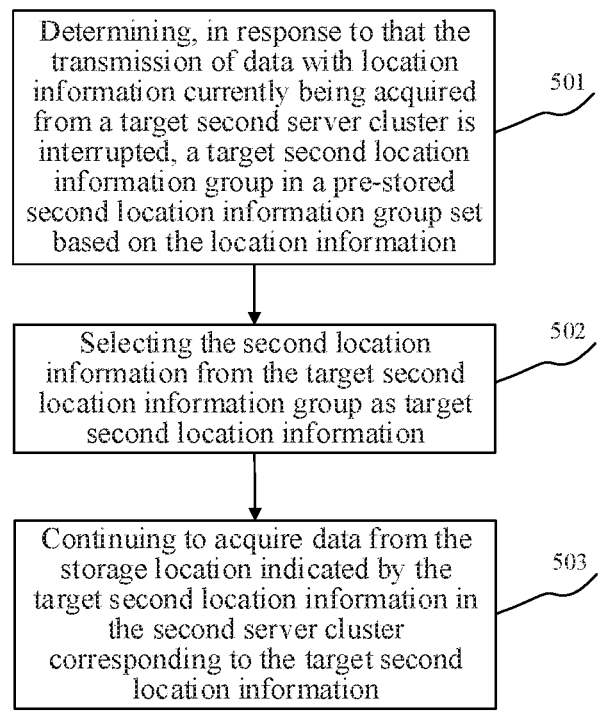
FIG. 5 is a flowchart of a method for processing data according to an embodiment of the present disclosure.

Further referring to FIG. 5, a flow 500 of a method for processing data according to an embodiment of is shown. The flow 500 of the method for processing data includes the following steps.

Step 501: determining, in response to that the transmission of data with location information currently being acquired from a target second server cluster is interrupted, a target second location information group in a pre-stored second location information group set based on the location information.

In the present embodiment, an electronic device (for example, the second client 109 shown in FIG. 1) on which the method for processing data runs may acquire data from the target second server cluster through a wired or wireless connection. If the transmission of data with location information currently being acquired from the target second server cluster is interrupted, the electronic device may determine the target second location information group in the pre-stored second location information group set based on the location information. The target second server cluster belongs to a second server cluster group. The target second server cluster may be a second server cluster preassigned for the electronic device, or a second server cluster selected by the electronic device from the second server cluster group, for example, a second server cluster selected using a load balancing algorithm, which is not limited by the present embodiment. Here, the location information may be information about a storage location of the data being acquired and having the location information in the target second server cluster. Each piece of second location information included in each location information group of the second location information group set may correspond to a different second server cluster in the second server cluster group. The target second location information contains second location information matching (for example, identical to, or the like) the location information. As an example, the second client may search a second location information group including second location information identical to the location information in the second location information group set, and use the found second location information group as the target second location information group. It should be noted that when the transmission speed of the data being acquired and having the location information is zero, or when the second client receives transmission abnormality information about the data, or the like, the second client may determine that the transmission of the data is interrupted, and the present embodiment does not limit the content in this regard.

In the present embodiment, the data in each second server cluster of the second server cluster group may be synchronized by a data synchronization terminal from a first server cluster in a first server cluster group to the second server cluster. The data in each first server cluster of the first server cluster group may be uploaded by a first client connected to the first server cluster.

Step 502: selecting the second location information from the target second location information group as target second location information.

In the present embodiment, the method of selecting the second location information from the target second location information group may be referred to the related description of step 205 in the embodiment shown in FIG. 2, or referred to the related description of step 406 and step 407 in the embodiment shown in FIG. 4, and details are not described herein again.

Step 503: continuing to acquire data from the storage location indicated by the target second location information in the second server cluster corresponding to the target second location information.

In the present embodiment, after determining the target second location information, the electronic device may continue to acquire data from the storage location indicated by the target second location information in the second server cluster corresponding to the target second location information.

The method provided by the above embodiment of the present disclosure effectively uses the determination of the target second location information, thereby avoiding the acquisition of data from the beginning in the second server cluster corresponding to the target second location information, and improving the data acquisition efficiency.

Figure 6:
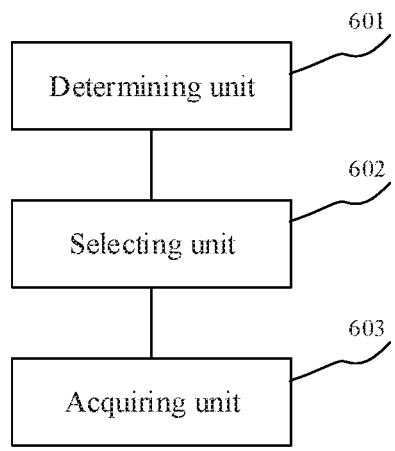
FIG. 6 is a schematic structural diagram of an apparatus for processing data according to an embodiment of the present disclosure.

Further referring to FIG. 6, as an implementation of the method shown in the above figures, an embodiment of the present disclosure provides an apparatus for processing data, the embodiment of the apparatus corresponds to the embodiment of the method shown in FIG. 5, and the apparatus may be specifically applied to various types of electronic devices.

As shown in FIG. 6, the apparatus for processing data 600 according to the present embodiment includes a determining unit 601, a selecting unit 602, and an acquiring unit 603. The determining unit 601 is configured to determine, in response to that the transmission of data with location information currently being acquired from a target second server cluster is interrupted, a target second location information group in a pre-stored second location information group set based on the location information, where the target second server cluster belongs to a second server cluster group, each piece of second location information included in each second location information group of the second location information group set corresponds to a different second server cluster in the second server cluster group, and the target second location information contains second location information matching the location information. The selecting unit 602 is configured to select the second location information from the target second location information group as target second location information. The acquiring unit 603 is configured to continue to acquire data from the storage location indicated by the target second location information in the second server cluster corresponding to the target second location information.

In the present embodiment, the specific processing of the determining unit 601, the selecting unit 602, and the acquiring unit 603 of the apparatus for processing data 600 and the technical effects thereof may be referred to the related description in step 501, step 502, and step 503 in the corresponding embodiment of FIG. 5, respectively. The description will not be repeated here.

In some alternative implementations of the present embodiment, each piece of second location information in the second location information group set may correspond to a piece of first location information, and the first location information may be information stored in a first server cluster about a storage location of data indicated by each piece of second location information stored in the second location information group.

In some alternative implementations of the present embodiment, the determining unit 601 may include: a determining subunit (not shown in the figure), configured to determine a target corresponding relationship in a pre-stored corresponding relationship list, where each corresponding relationship in the corresponding relationship list includes second location information and first location information, the storage location indicated by the second location information is a storage location in the target second server cluster, and the target corresponding relationship is a corresponding relationship in which the included second location information matches the location information; and a search subunit (not shown in the figure), configured to search the second location information group set for a second location information group where the corresponding first location information is the same as the first location information included in the target corresponding relationship, and use the found second location information group as the target second location information group.

In some alternative implementations of the present embodiment, the location information may include an index number, and the second location information included in each corresponding relationship of the corresponding relationship list may include a first index number; and the determining subunit may include: a first search module (not shown in the figure), configured to search the corresponding relationship list for a corresponding relationship in which the included second location information is the same as the location information; and a second search module (not shown in the figure), configured to search, in response to the corresponding relationship being not found, the corresponding relationship list for a corresponding relationship in which the included second location information includes a target first index number, and use the found corresponding relationship in which the included second location information includes the target first index number as the target corresponding relationship, where the target first index number satisfies any one of the following conditions: closest to the index number and smaller than the index number, or closest to the index number and greater than the index number.

In some alternative implementations of the present embodiment, the second search module may be further configured to: perform the following processing steps: adding or subtracting the index number by a preset value to obtain an index number range, searching a corresponding relationship in which the included second location information includes the target first index number among the corresponding relationships that the first index numbers in the included second location information are within the index number range in the corresponding relationship list, and using, in response to the corresponding relationship being found, the found corresponding relationship in which the included second location information includes the target first index number as the target corresponding relationship; and increase the current preset value in response to that the corresponding relationship in which the included second location information includes the target first index number is not found, and continue to perform the processing steps.

In some alternative implementations of the present embodiment, the selecting unit 602 may include: a candidate second server cluster group determining subunit (not shown in the figure), configured to obtain a candidate second server cluster group based on the target second location information group; and a processing subunit (not shown in the figure), configured to select, based on the latest received load of each candidate second server cluster in the candidate second server cluster group, a candidate second server cluster from the candidate second server cluster group, and use the second location information in the target second location information group corresponding to the selected candidate second server cluster as the target second location information, where the load is received from a monitoring terminal connected to the apparatus for processing data.

In some alternative implementations of the present embodiment, some of the second server clusters in the second server cluster group may be deployed in a given machine room, and the second client may have corresponding machine room information; and the processing subunit may include: a first selecting module (not shown in the figure), configured to determine whether non-overload candidate second server clusters exist among the candidate second server clusters deployed in a machine room indicated by the machine room information in the candidate second server cluster group, and select, in response to that non-overload candidate second server clusters exist, a candidate second server cluster having a minimum load from the non-overload candidate second server clusters.

In some alternative implementations of the present embodiment, the processing subunit may include: a second selecting module (not shown in the figure), configured to select, in response to that non-overload candidate second server clusters do not exist, a non-overload candidate second server cluster having a minimum load from the candidate second server clusters not deployed in the machine room indicated by the machine room information in the candidate second server cluster group.

In some alternative implementations of the present embodiment, the apparatus 600 may further include: a switching unit (not shown in the figure), configured to switch, in response to receiving a second cluster switching instruction sent by the monitoring terminal, from the currently connected second server cluster to the second server cluster indicated by the received second cluster switching instruction.

In some alternative implementations of the present embodiment, the apparatus 600 may further include: a first acquiring unit (not shown in the figure), configured to acquire, in response to receiving a second speed limit instruction including a second transmission speed sent by the monitoring terminal, data using the second transmission speed.

The apparatus provided by the above embodiment of the present disclosure effectively uses the determination of the target second location information, thereby avoiding the acquisition of data from the beginning in the second server cluster corresponding to the target second location information, and improving the data acquisition efficiency.

Figure 7:
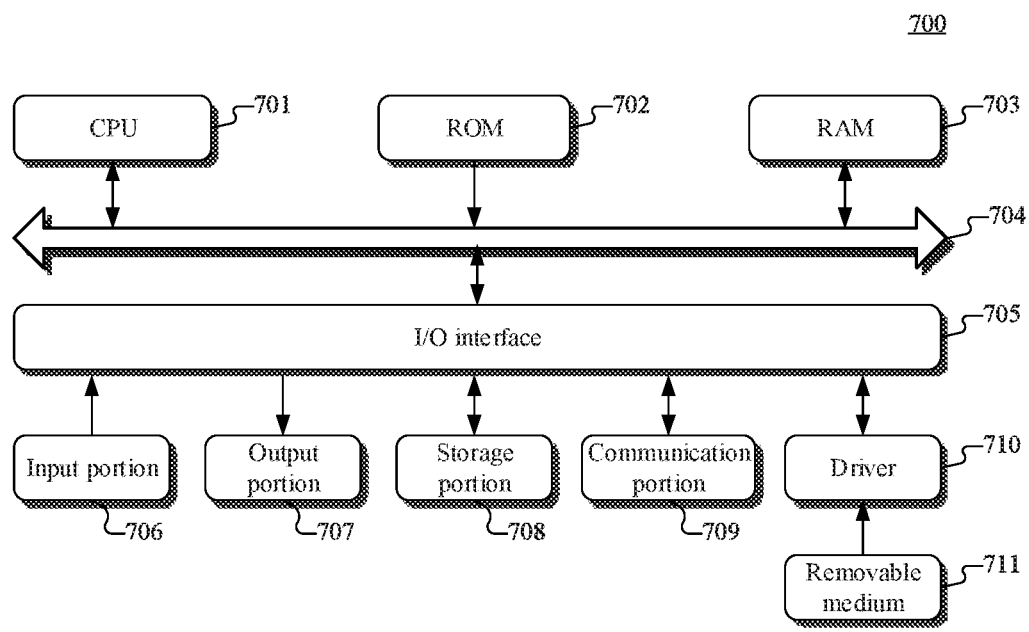
FIG. 7 is a schematic structural diagram of a computer system adapted to implement an electronic device of the embodiments of the present disclosure.

Referring to FIG. 7, a schematic structural diagram of a computer system 700 adapted to implement the electronic device according to embodiments of the present disclosure is shown. The electronic device shown in FIG. 7 is merely an example, and should not limit the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including such as a cathode ray tube (CRT), a liquid crystal display device (LCD), a speaker, etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, so that a computer program read therefrom is installed on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 709, and/or may be installed from the removable media 711. The computer program, when executed by the CPU 701, implements the functions as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a determining unit, a selecting unit, and an acquiring unit. Here, the names of these units do not in some cases constitute a limitation to such units themselves. For example, the determining unit may also be described as "a unit configured to determine a target second location information group in a pre-stored second location information group set".

In another aspect, the present disclosure further provides a computer-readable medium. The computer-readable medium may be included in the electronic device described in the above described embodiments, or a stand-alone computer-readable medium not assembled into the electronic device. The computer-readable medium stores one or more programs. The one or more programs, when executed by the electronic device, cause the electronic device to: determine, in response to that the transmission of data with location information currently being acquired from a target second server cluster is interrupted, a target second location information group in a pre-stored second location information group set based on the location information, where the target second server cluster belongs to a second server cluster group, each piece of second location information included in each second location information group of the second location information group set corresponds to a different second server cluster in the second server cluster group, and the target second location information contains second location information matching the location information; select the second location information from the target second location information group as target second location information; and continue to acquire data from the storage location indicated by the target second location information in the second server cluster corresponding to the target second location information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A system having a redundant cluster for processing data, comprising a first client, a data synchronization terminal, and a second client; wherein:
   the first client is configured to receive a data sending instruction, and send data indicated by the data sending instruction to a first server cluster in a first server cluster group;

the data synchronization terminal is configured to synchronize data in the first server cluster of the first server cluster group to each second server cluster in a second server cluster group; and the second client is configured to acquire data from a target second server cluster, the target second server cluster belonging to the second server cluster group; determine, in response to that transmission of data with location information currently being acquired from the target second server cluster is interrupted, a target second location information group in a pre-stored second location information group set based on the location information in the data, wherein each piece of second location information included in each second location information group of the second location information group set corresponds to a different second server cluster in the second server cluster group, and the target second location information group contains second location information matching the location information; select the second location information from the target second location information group as target second location information; and continue to acquire data in the second server cluster from a storage location indicated by the target second location information, the target second location information being different from second location information corresponding to the target second server cluster; and the transmission of data is determined to be interrupted when acquired transmission speed of the data having the location information is zero;

wherein the system further comprises a monitoring terminal, configured to perform at least one operation of:

sending, when monitoring that bandwidth utilization of a first server cluster in the first server cluster group exceeds a threshold, a first speed limit instruction comprising a first transmission speed to at least one first client in a first client group currently connected to the first server cluster; or sending, when monitoring that bandwidth utilization of a second server cluster in the second server cluster group exceeds the threshold, a second speed limit instruction comprising a second transmission speed to at least one second client in a second client group currently connected to the second server cluster;

wherein the first client is further configured to:

send, in response to receiving the first speed limit instruction sent by the monitoring terminal, data using the first transmission speed included in the received first speed limit instruction;

wherein the second client is further configured to:

acquire, in response to receiving the second speed limit instruction sent by the monitoring terminal, data using the second transmission speed included in the received second speed limit instruction.

2. The system according to claim 1, wherein each piece of second location information in the second location information group set corresponds to a piece of first location information, and the first location information is information stored in a first server cluster about a storage location of data indicated by each piece of second location information stored in the second location information group.

3. The system according to claim 2, wherein the second client is further configured to:

determine a target corresponding relationship in a pre-stored corresponding relationship list, wherein each corresponding relationship in the corresponding relationship list comprises second location information and first location information, the storage location indicated by the second location information is a storage location in the target second server cluster, and the target corresponding relationship is a corresponding relationship in which the included second location information matches the location information;

search the second location information group set for a second location information group where corresponding first location information is the same as the first location information included in the target corresponding relationship, and use the found second location information group as the target second location information group.

4. The system according to claim 3, wherein the location information comprises an index number, and the second location information included in each corresponding relationship of the corresponding relationship list comprises a first index number; and the second client is further configured to:

search the corresponding relationship list for a corresponding relationship in which the included second location information is the same as the location information; and search, in response to the corresponding relationship being not found, the corresponding relationship list for a corresponding relationship in which the included second location information comprises a target first index number, and use the found corresponding relationship in which the included second location information comprises the target first index number as the target corresponding relationship, wherein the target first index number satisfies any one of following conditions: closest to the index number and smaller than the index number, or closest to the index number and greater than the index number.

5. The system according to claim 4, wherein the second client is further configured to:

perform following processing: adding or subtracting the index number by a preset value to obtain an index number range, searching a corresponding relationship in which the included second location information comprises the target first index number among the corresponding relationships that the first index numbers in the included second location information are within the index number range in the corresponding relationship list, and using, in response to the corresponding relationship being found, the found corresponding relationship in which the included second location information comprises the target first index number as the target corresponding relationship; and increase the current preset value in response to that the corresponding relationship that the included second location information comprises the target first index number is not found, and continue to perform the processing.

6. The system according to claim 1, wherein the system further comprises a monitoring terminal, configured to perform at least one operation of:

monitoring a load of each first server cluster in the first server cluster group, and feed the monitored load of each first server cluster in the first server cluster group back to the first client; or monitoring a load of each second server cluster in the second server cluster group, and feed the monitored load of each second server cluster in the second server cluster group back to the second client.

7. The system according to claim 6, wherein the second client is further configured to:
- obtain a candidate second server cluster group based on the target second location information group;
- select, based on the latest received load of each candidate second server cluster in the candidate second server cluster group, a candidate second server cluster from the candidate second server cluster group, and use the second location information in the target second location information group corresponding to the selected candidate second server cluster as target second location information.

8. The system according to claim 7, wherein some of the second server clusters in the second server cluster group are deployed in a given machine room, and the second client has corresponding machine room information; and
the second client is further configured to:
- determine whether non-overload candidate second server clusters exist among the candidate second server clusters deployed in a machine room indicated by the machine room information in the candidate second server cluster group, and select, in response to that non-overload candidate second server clusters exist, a candidate second server cluster having a minimum load from the non-overload candidate second server clusters.

9. The system according to claim 8, wherein the second client is further configured to:
- select, in response to that non-overload candidate second server clusters do not exist, a non-overload candidate second server cluster having a minimum load from the candidate second server clusters not deployed in the machine room indicated by the machine room information in the candidate second server cluster group.

10. The system according to claim 6, wherein the monitoring terminal is further configured to perform at least one operation of:
- sending, when monitoring that a first server cluster in the first server cluster group is overloaded, a first cluster switching instruction to at least one first client in a first client group currently connected to the first server cluster; or
- sending, when monitoring that a second server cluster in the second server cluster group is overloaded, a second cluster switching instruction to at least one second client in the second client group currently connected to the second server cluster.

11. The system according to claim 10, wherein the first client is further configured to:
- switch, in response to receiving the first cluster switching instruction sent by the monitoring terminal, from the currently connected first server cluster to another first server cluster indicated by the received first cluster switching instruction.

12. The system according to claim 10, wherein the second client is further configured to:
- switch, in response to receiving the second cluster switching instruction sent by the monitoring terminal, from the currently connected second server cluster to another second server cluster indicated by the received second cluster switching instruction.

13. A method having a redundant cluster for processing data, comprising:
- determining, in response to that transmission of data with location information currently being acquired from a target second server cluster is interrupted, a target second location information group in a pre-stored second location information group set based on the location information in the data, wherein the target second server cluster belongs to a second server cluster group, each piece of second location information included in each second location information group of the second location information group set corresponds to a different second server cluster in the second server cluster group, and the target second location information contains second location information matching the location information, the target second location information being different from second location information corresponding to the target second server cluster, and the transmission of data is determined to be interrupted when acquired transmission speed of the data having the location information is zero, and the data being synchronized from a first server cluster of a first server cluster group to each second server cluster in the second server cluster group by a data synchronization terminal;
- selecting the second location information from the target second location information group as target second location information;
- continuing to acquire data in the second server cluster from the storage location indicated by the target second location information;
- sending, when monitoring that bandwidth utilization of a first server cluster in the first server cluster group exceeds a threshold, a first speed limit instruction comprising a first transmission speed to at least one first client in a first client group currently connected to the first server cluster; or sending, when monitoring that bandwidth utilization of a second server cluster in the second server cluster group exceeds the threshold, a second speed limit instruction comprising a second transmission speed to at least one second client in a second client group currently connected to the second server cluster;
- sending, in response to receiving the first speed limit instruction sent by a monitoring terminal, data using the first transmission speed included in the received first speed limit instruction; and
- acquiring, in response to receiving the second speed limit instruction sent by the monitoring terminal, data using the second transmission speed included in the received second speed limit instruction.

14. An apparatus having a redundant cluster for processing data, comprising:
- at least one processor; and
- a memory storing instructions, wherein the instructions when executed by the at least one processor, cause the at least one processor to perform operations, the operations comprising:
- determining, in response to that transmission of data with location information currently being acquired from a target second server cluster is interrupted, a target second location information group in a pre-stored second location information group set based on the location information in the data, wherein the target second server cluster belongs to a second server cluster group, each piece of second location information included in each second location information group of the second location information group set corresponds to a different second server cluster in the second server cluster group, and the target second location information contains second location information matching the location information, the target second location information being different from second location information corresponding to the target second server cluster, and the transmission of data is determined to be interrupted when acquired transmission speed of the data having the location information is zero, and the data being synchronized from a first server cluster of a first server cluster group to each second server cluster in the second server cluster group by a data synchronization terminal;

selecting the second location information from the target second location information group as target second location information;

continuing to acquire data in the second server cluster from the storage location indicated by the target second location information;

sending, when monitoring that bandwidth utilization of a first server cluster in the first server cluster group exceeds a threshold, a first speed limit instruction comprising a first transmission speed to at least one first client in a first client group currently connected to the first server cluster; or sending, when monitoring that bandwidth utilization of a second server cluster in the second server cluster group exceeds the threshold, a second speed limit instruction comprising a second transmission speed to at least one second client in a second client group currently connected to the second server cluster;

sending, in response to receiving the first speed limit instruction sent by a monitoring terminal, data using the first transmission speed included in the received first speed limit instruction; and acquiring, in response to receiving the second speed limit instruction sent by the monitoring terminal, data using the second transmission speed included in the received second speed limit instruction.

15. A non-transitory computer-readable storage medium, storing a computer program thereon, the program, when executed by a processor, causes the processor to implement the method according to claim 13.

* * * * *